March 8, 1932. W. A. BLUHM 1,848,306
HELICOPTER
Filed March 18, 1930  2 Sheets-Sheet 2
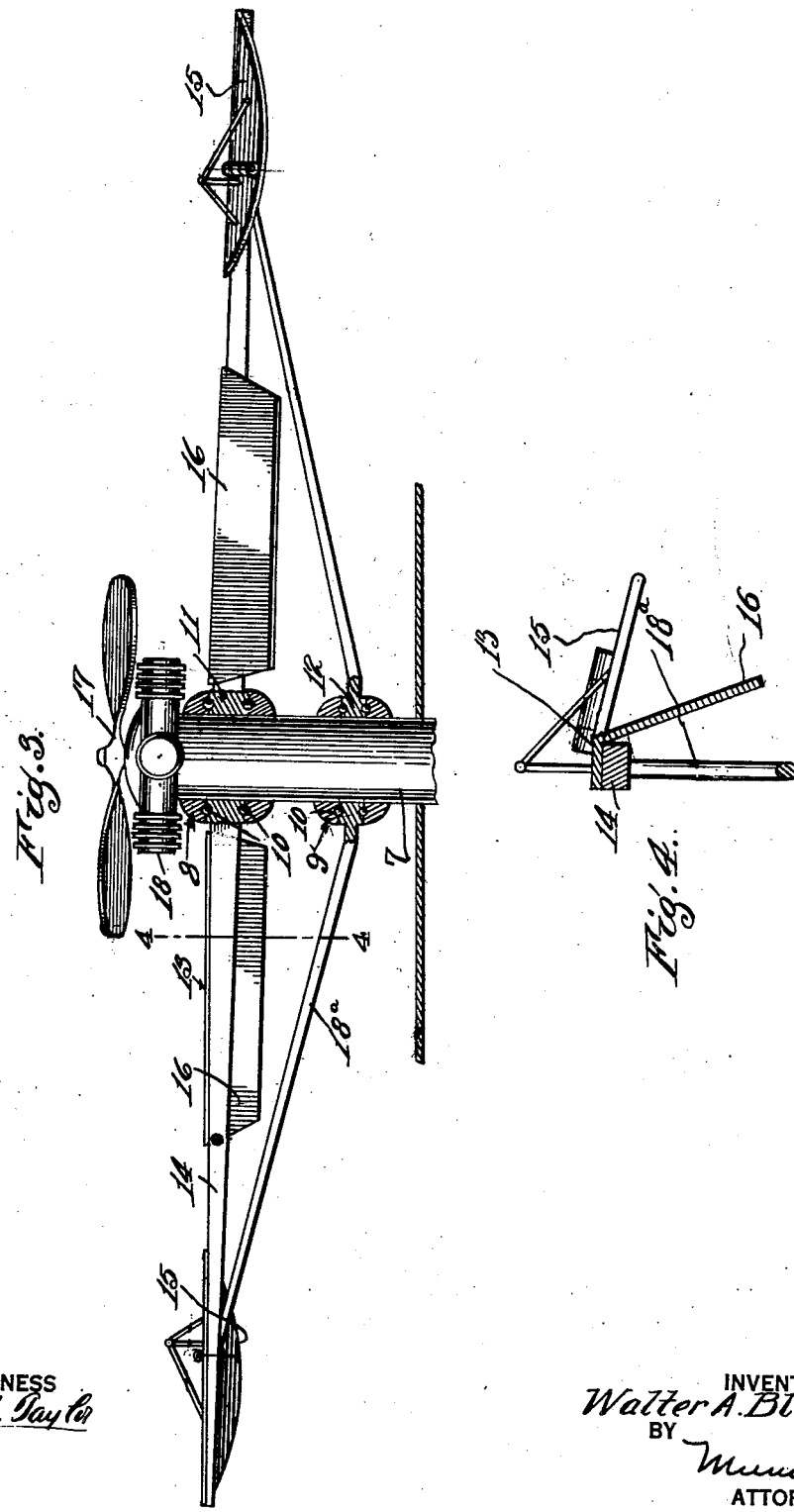
WITNESS
J. H. Taylor
INVENTOR
Walter A. Bluhm
BY
ATTORNEY Patented Mar. 8, 1932

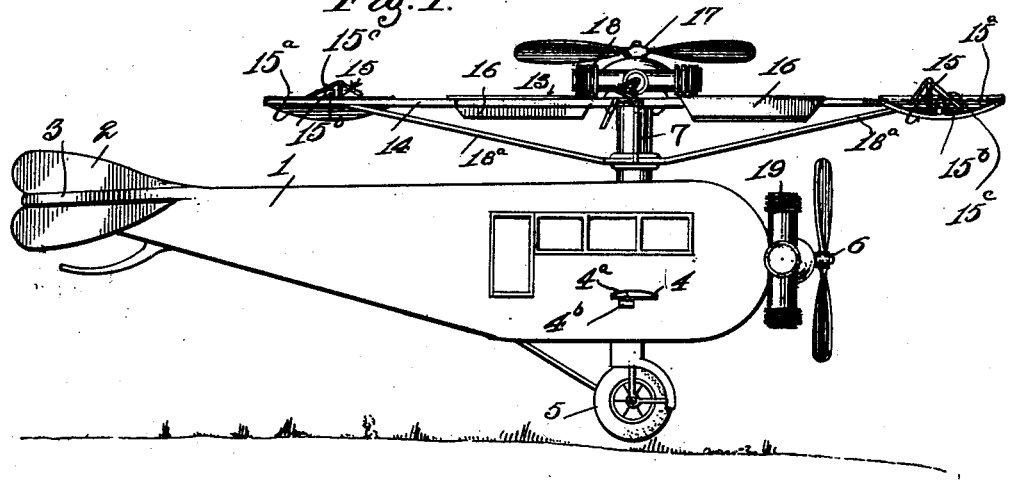
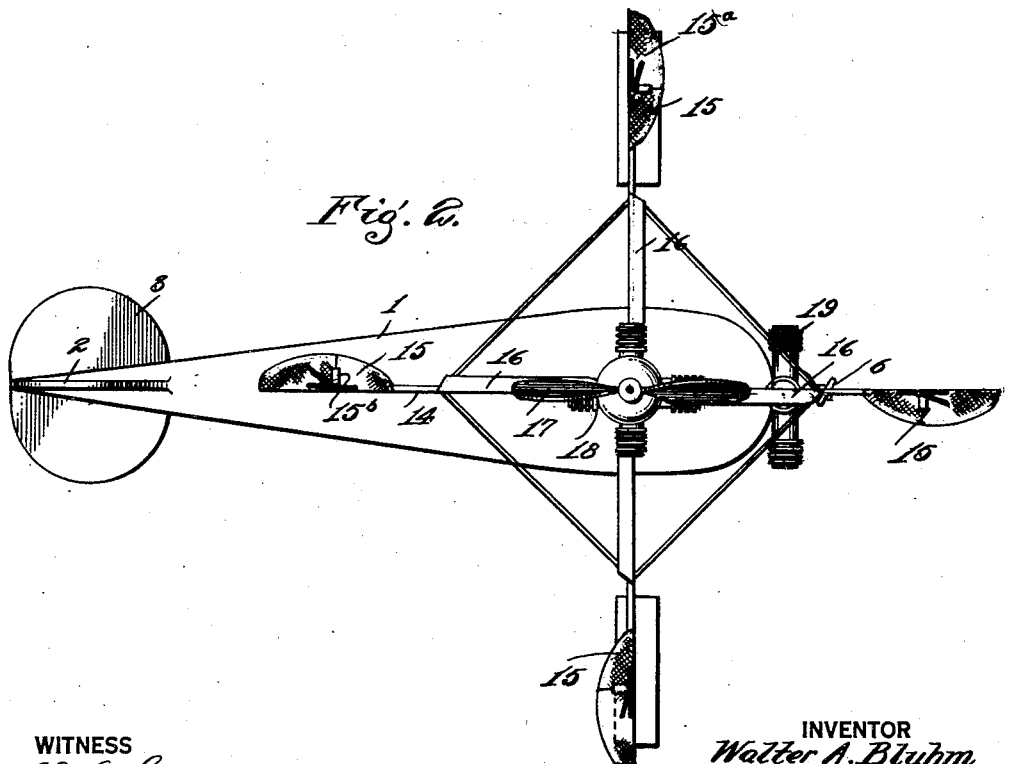

1,848,306

UNITED STATES PATENT OFFICE

WALTER A. BLUHM, OF CHICAGO, ILLINOIS

HELICOPTER

Application filed March 18, 1930. Serial No. 436,846.

My invention relates to air vehicles, more particularly to air vehicles known as helicopters and it consists in the constructions, arrangements and combinations herein defined and claimed.

An object of my invention is to provide a helicopter which utilizes the lifting force of a vertically positioned propeller, as well as the lifting force of a helicopter rotor with lifting vanes positioned thereon.

A further object of my invention is to provide a helicopter having a vertically arranged propeller, as well as a rotor in which said propeller and said rotor are driven by a unitary power means.

A further object of my invention is to provide a helicopter which is equipped with driving apparatuses for horizontal flight, as well as driving apparatuses for rectilinear vertical flight.

A still further object of my invention is to provide a device of the type described, which is simple to manufacture, has few parts and does not get out of order easily.

Other objects and advantages will appear as the specification proceeds and the invention will be more particularly defined in the appended claims.

My device is illustrated in the accompanying drawings forming a part of this application, in which:

Figure 1 is a side elevational view of the invention;

Figure 2 is a top plan view of the invention;

Figure 3 is an elevational detail view of a portion of the device; and

Figure 4 is a sectional view on line 4—4 of Figure 3.

In carrying out my invention I make use of an ordinary airplane fuselage which is equipped with the conventional airplane parts such as the rudder 2, the stabilizers and the elevators 3, the wings 4, and aileron 4ª, the landing gear 5 and the horizontally positioned propeller 6. Suitable controls (not shown) for the rudders, elevators and ailerons are to be provided and use may be made of any of the conventional methods in use in airplanes. The wings 4 and ailerons 4ª are mounted on the fuselage in spaced relation by the supports 4ᵇ, which position said parts out of the wind stream of the vertically positioned propeller.

In adapting this construction to my invention I mount by any suitable means above the center of gravity of the airplane, a hollow steel shaft 7. This hollow steel shaft has positioned in spaced relation there-along, the bearing collars 8 and 9 having the roller bearings 10 mounted therein for cooperation with bearing collars 11 and 12 for the mounting of the rotor 13 as is easily understood.

This rotor 13 comprises a plurality of laterally extending arms 14. In this embodiment of the invention I have shown four of such arms. It is obvious, however, that any desired number of such arms could be used without departing from the spirit of my invention. These arms 14 are integrally related to the upper collar 11 as appears most clearly in Figure 3.

The arms 14 are equipped at their outer extremities with vanes 15 which I term lifting or supporting vanes. These vanes are secured to the arms 14 by any suitable means at any suitable angle and are shown as mounted thereon, at an angle of 10° with the horizontal, which angle I have found to be the most efficient for supporting the plane both in vertical and horizontal flight. They are positioned at either side of the arms 14 as desired.

Portions 15ª of the vanes 15 are hinged as shown at 15ᵇ to compensate for the fact that during rotation of the helicopter rotor one of the arms will be moving against the line of flight while another is moving with the line of flight. It is obvious that this hinge will permit flexing of the vane with consequent decrease of the resistance offered by the vane when the same is moved against the direction of flight. These portions 15ª are strengthened by supports 15ᶜ.

As appears from the drawings, the arms 14 comprised in the rotor 13 are by means of the collars 11 and 12 loosely positioned upon the hollow shaft 7. It is my plan to rotate this rotor 13 by means of wind vanes 16 positioned on said arms 14 immediately below the vertically-positioned propeller 17. These vanes 16 may be positioned at any angle relative to the horizontal upon said arms 14 and may be mounted upon either side of said arms. It is important, however, that they be positioned below the propeller 17. In the embodiment I have shown them positioned at an angle of about 70°, which angle I have found most effective for the rotation of the rotor. It is obvious that said rotor may be made to rotate either in a direction which is opposite to the direction of rotation of the propeller 17 or in an opposite direction by changing the positioning of the vanes 16 from one side of the arms to the other.

For driving the propeller 17 a motor 18 of any desired construction, shown herein as a radial type motor, is positioned at the top of the hollow steel shaft 7. It is readily seen from examination of Figure 3 that the wind stream generated by said propeller will be directed upon the vanes 16 rotating the same as set forth.

Suitable supporting rods 18ª integral with the lower collar 12 are utilized to support the arms 14, thereby lending great strength and rigidity to the rotor arms.

From the foregoing description the operation of my device is readily understood. The rotor 13 is set into operation when the vertical propeller rotates. Control means (not shown) in the cabin of the fuselage actuate the motor to rotate the propeller 17. This rotation exerts a strong lift on the airplane at the same time generating a wind stream of high velocity in which the vanes 16 of the rotor 13 are positioned. The force of this wind stream exerted on the vanes 16 sets the arms 14 into rotation either in the same direction of rotation of the propeller 17 or in an opposite direction, thereby rotating the vanes 15 which augment the lift secured by the propeller 17. Due to the anti-frictional mounting of the rotor 13 a rapid rotation of the rotor can be obtained by this means.

When it is desired to take on horizontal flight, the propeller 6 is set into motion by the motor 19 and associated controls (not shown). The lifting vanes 15 of the rotor serve as supporting wings during such flight in the same manner as the wings of an airplane of conventional construction.

It is thus easily seen that I have provided a helicopter which utilizes the lifting force of a vertically positioned propeller and augments said lifting force by the lifting force of a rotor and that I have further provided a simple unitary means for operating both of said lifting means.

It is also easily seen that I have provided a helicopter which utilizes the lifting vanes of the rotor for use in horizontal, as well as vertical flight.

What I claim is:

1. In a helicopter, an aircraft body having means for forward propulsion, a vertically positioned shaft projecting from the top of said body, a motor and associated propeller positioned at the upper extremity of said shaft, said propeller being rotatable in a horizontal plane, a horizontally rotatable rotor mounted on said shaft for free rotation, lifting vanes hingedly mounted on said rotor and driving vanes mounted on said rotor for operation by the wind stream generated by said propeller.

2. In a helicopter, an aircraft body having means for forward propulsion, a vertically positioned shaft at a forward portion of said body and projecting from the top thereof, a motor and associated propeller positioned at the upper extremity of said shaft, said propeller being rotatable in a horizontal plane, a horizontally rotatable rotor mounted on said shaft for free rotation and disposed beneath said propeller, said rotor having a plurality of radially extended arms, lifting vanes hingedly mounted adjacent the extremities of said arms, and driving vanes mounted on said arms in the path of the wind stream generated by said propeller.

WALTER A. BLUHM.